Patented Feb. 8, 1927.

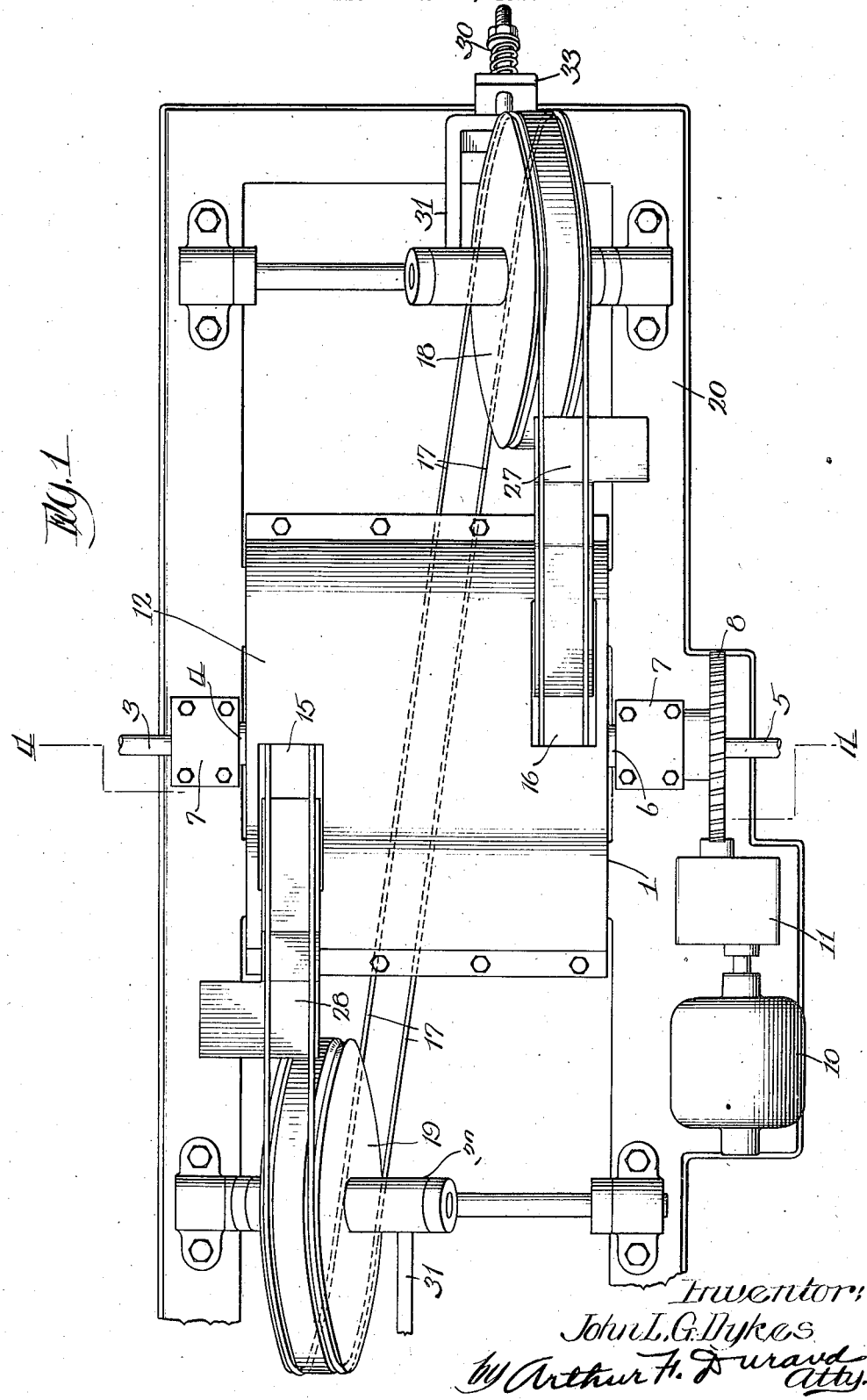

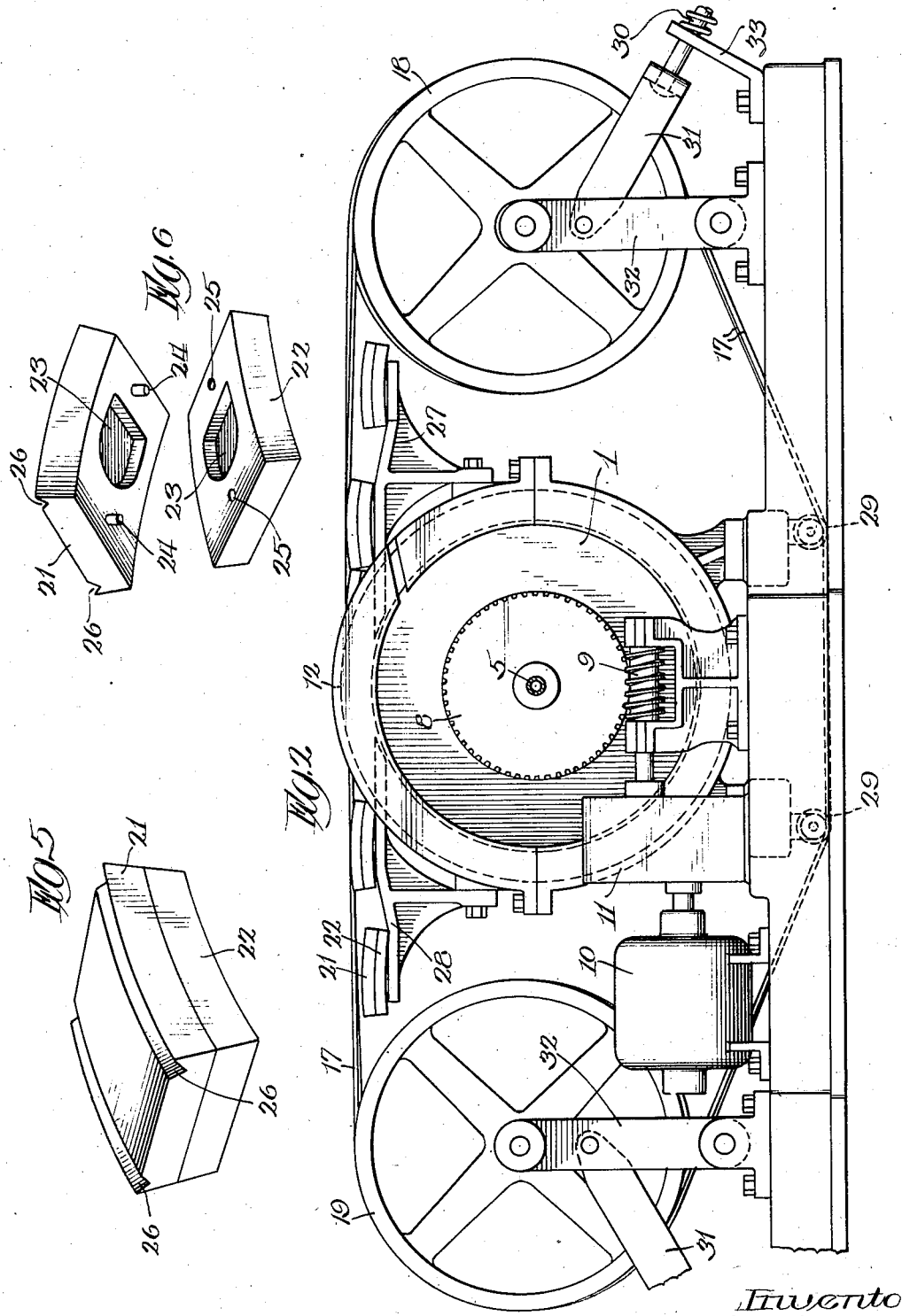

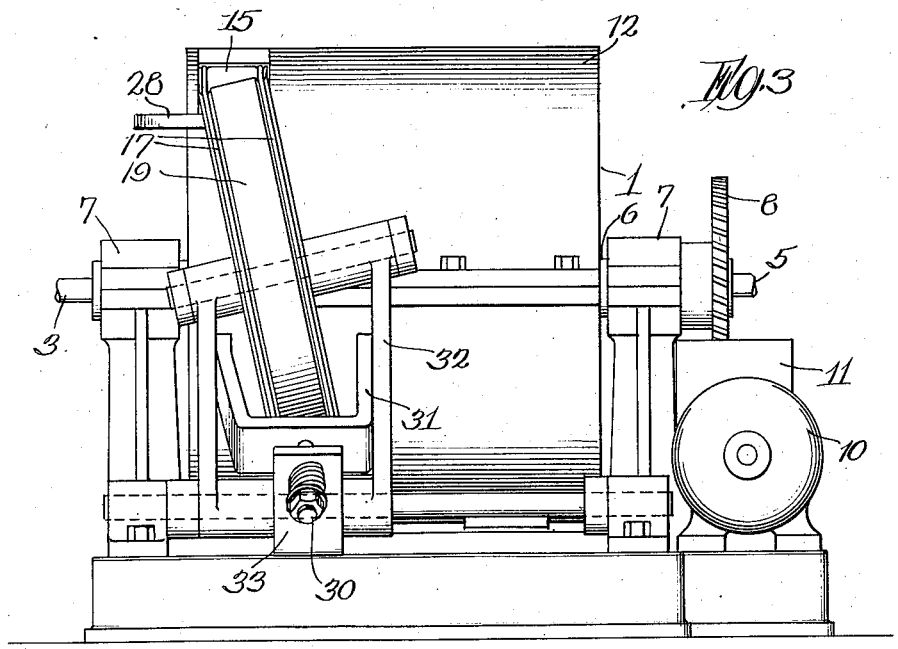
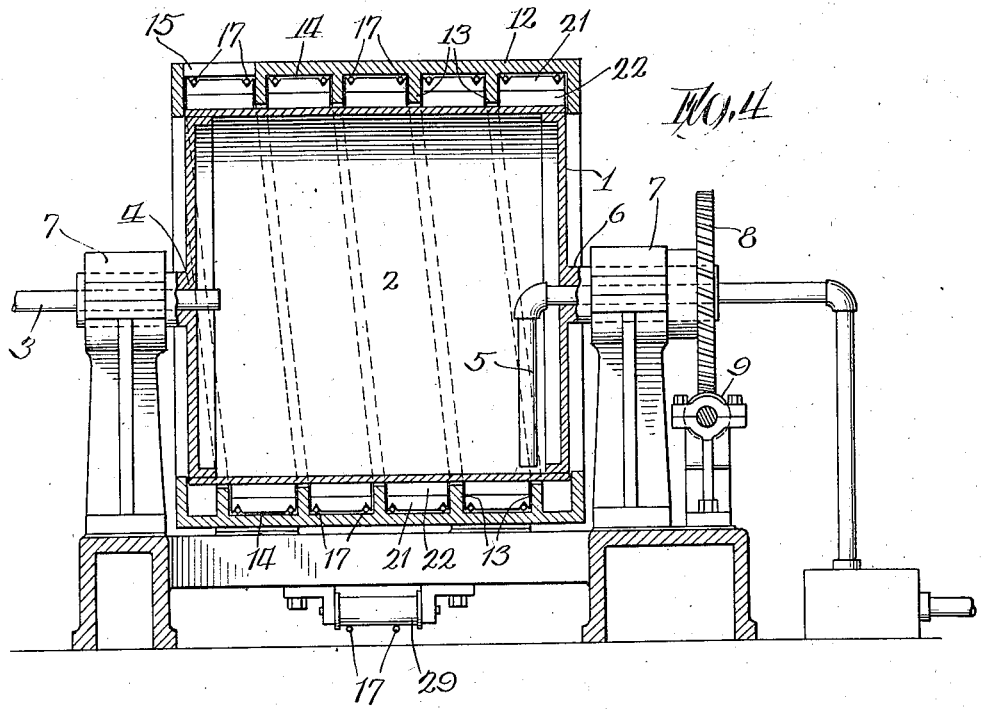

1,616,954

UNITED STATES PATENT OFFICE.

JOHN L. G. DYKES, OF CHICAGO, ILLINOIS.

PROCESS AND APPARATUS FOR VULCANIZING ARTICLES.

Application filed June 27, 1923. Serial No. 648,009.

This is an improvement upon the method and apparatus disclosed in prior applications Nos. 408,764 filed September 7, 1920, and 596,834 filed October 25, 1922.

Generally stated, the object of the improvements constituting the present invention are to provide a novel construction and arrangement and method whereby separate and unconnected articles may be vulcanized, while travel ng in series along a path of travel which is curved about an axis of motion, broadly considered, or whereby the articles in their separate molds may be caused to travel along a spiral path of travel, while being vulcanized by the application of heat at vulcanizing temperature thereto, the separate molds being caused to enter the sp ral path of travel in any suitable or desired manner, and being caused to leave the spiral path of travel after the articles contained in the molds have been sufficiently vulcanized.

It is also an object to provide certain details and features of construction and combinations tend ng to increase the general efficiency and the desirability of a vulcanizing apparatus and method of this particular character.

To the foregoing and other useful ends the invention consists in matters hereinafter set forth and claimed and shown in the accompany ng drawings in which—

Figure 1 is a plan of a vulcanizing machine embodying the principles of the invention.

Figure 2 is a side elevation of said machine.

Figure 3 is an end elevat on of said machine.

Figure 4 is a transverse section on line 4—4 in Figure 1.

Figure 5 is a perspective of one of the two-part molds in which the separate articles to be made are vulcanized.

Figure 6 is a perspective of the mold with the two sections thereof separated.

As thus illustrated, the invention comprises a rotary drum 1 having a chamber 2 therein for steam or other vulcanizing heat medium, the steam being conducted into said chamber through a pipe 3 extending through one trunnion journal 4 of the drum, and the water of condensat on being taken off through a pipe 5 leading through the other trunnion or journal 6 of said drum. These two journals or trunnions are mounted to rotate in bearings 7 of any suitable or desired character, and the trunnion 6 has a worm wheel 8 engaged by the worm 9, thus forming worm gearing to drive the drum. Said worm gearing is driven by a motor 10 of any suitable character, preferably through the med um of a reduction gearing, of any suitable character, in the housing 11 shown interposed between the motor and the worm gearing. An outer casing 12 is provided with a spirally formed inner web or flange 13, whereby a spiral channel 14 is formed on the inner surface of this casing, thereby to provide a spiral path of travel for the articles to be vulcanized. The casing 12 is provided with openings 15 and 16 for the entrance and departure of the articles to be vulcanized, as will hereinafter more fully appear.

The instrumentalities for causing the articles to be vulcanized to travel along a spiral path of travel include, in addition to the sp ral channel 14, the belts 17 which travel around idlers 18 and 19 mounted in any suitable manner on the body frame 20 of the machine, these belts being wound spirally around said drum. The belts enter one of the openings 15 or 16 and leave at the other opening, but these belts are not driven except when the molds shown in Figure 5 are placed between the belt and the drum. Each mold, it will be seen, comprises an outer section 21 and an inner section 22, w.th cavities 23 on their opposing surfaces, thereby to form, for example, a rubber heel. Dowel pins 24 and holes 25 therefor serve as means for accurately coupling the two sections of each mold together. Each outer section 21 is provided with channels 26 for said belts, it being observed that each mold is curved about the axis of the drum. A guide 27 is provided in position to feed the molds on to the belts and through the opening 16 to the spiral channel 14, and a similar guide 28 is provided at the other side to receive the discharged molds from the other end of the spiral path of travel, as the molds come out one by one from the opening 15 at the other end of the drum. Of course, it will be understood that the machine will run either way, and that the molds can be allowed to enter the vulcanizing path through the opening 15, and to depart therefrom through the opening 16, if so des red. The lower portions of the belts travel around idlers 29 disposed below the drum, and mounted on the body frame in any suitable manner. It will be understood that the belts are maintained taut by springs 30 applied to the links 31 that connect the swinging supports 32 to the stationary brackets 33 on the machine body, these supports 32 forming movable bearings for the idlers 19 and 20, whereby the action of said springs is to pull the idlers away from the drum and thus keep the belts taut. Of course, the tension of the springs 30 can be such that the belts will be driven even when no molds are in the machine, but it is only necessary to have sufficient tension on the belts to drive them when the molds are entering and leaving the machine in the desired manner. In other words, the belts hold the molds tightly against the surface of the drum, and the friction is sufficient, between the drum and the molds, to cause the molds to move along the spiral channel 14, the friction between the molds and the spiral rib 13 being less than the friction between the drum and the molds.

In use, the molds are filled with the proper amount of rubber or rubber composition, to make rubber heels or other articles, and each mold is then closed, and the molds are successively fed into the machine in the manner indicated, either through the opening 15 or the opening 16, depending upon which way the machine is running. The machine runs at a speed to ensure vulcanization of the articles before the molds leave the spiral path of travel at the other end of the drum, the speed being determined in any suitable or desired manner. The molds are unconnected, of course, and are allowed to enter the machine one after the other, in unconnected condition, but they may be fed one after the other, close together, in order to keep the machine running at full capacity. The machine, therefore, may run continuously and the vulcanizing operation is carried on continuously without stopping. As many molds will be provided as are necessary in order to ensure a constant supply of fresh molds for loading and insertion in the machine. The articles made are separate and distinct from each other, but they follow a spiral path of travel while passing through the machine, so that a series of separate and distinct articles is made by the operation of the machine in the manner explained. The molds travel around the axis of the drum, and each mold travels around said axis several times, thus ensuring a practically long path of travel in a comparatively small or condensed space. Practically all of the molds are being subjected to the same degree of temperature, for vulcanizing, while they are passing through the machine, and the apparatus is thus of a compact nature, and the vulcanizing heat area is condensed into a small space, notwithstanding the fact that the length of the path of travel of the molds is quite great, for if stretched out straight the path of travel would be quite long. Thus the spiral path of travel ensures a desired extent of travel of the rubber articles, and the requisite amount of time for vulcanization of the articles, in separate and unconnected molds, in a much more advantageous manner than would be the case if the path of travel were along a straight line, for in such case the machine would have to be of considerable length and there would be difficulties and complications with respect to the application of heat and the feeding of the molds in the desired manner at a sufficiently high rate of speed to ensure production and low cost of manufacture.

It will be seen that the materials, of any suitable or desired character, for the production of any desired article of manufacture, are caused to travel a spiral path of travel formed in any suitable or desired manner, but preferably by means of a rotary drum and endless belt-like means wound spirally around the drum, whereby the spiral path of travel is provided for the rubber or similar materials to be vulcanized to produce the desired series of separate articles of manufacture.

It will be seen that the instrumentalities for forming the spiral path of travel for the materials to be vulcanized include inner and outer mold sections, which are separate, and which enter the spiral path of travel at one end of the vulcanizing drum and which leave the spiral path of travel at the other end of the vulcanizing drum, whereby the materials to be vulcanized are formed into the desired series of separate articles between successive outer sections and successive inner sections, and each outer section having the inner section co-operating therewith to produce the desired formation for the materials to be vulcanized.

What I claim as my invention is—

1. In vulcanizing apparatus, the combination of instrumentalities to form a spiral path of travel for the materials to be vulcanized, devices for causing the materials to have movement along said path of travel at the desired rate of speed for vulcanizing purposes, comprising molding means to form a series of separate articles from said materials, and means to apply vulcanizing heat to said materials while moving along said spiral path of travel.

2. A structure as specified in claim 1, said instrumentalities comprising a rotary drum around which said spiral path of travel is formed, so that the axis of the spiral is coincident with the axis of the drum, and said drum having an interior heating chamber forming part of said means for supplying vulcanizing heat to said materials.

3. A structure as specified in claim 1, comprising an endless belt wound spirally to hold said materials in said spiral path of travel thereof.

4. In vulcanizing apparatus, the combination of instrumentalities to form a spiral path of travel for the materials to be vulcanized, devices for causing the materials to have movement along said path of travel at the desired rate of speed for vulcanizing purposes, comprising molding means to form the materials into a series of separate articles, and means to apply vulcanizing heat to said materials while moving along said spiral path of travel, said instrumentalities comprising separate inner and outer mold sections for the materials to be vulcanized, said mold sections forming a separate mold for each article, and each mold entering said path of travel at one end of the spiral and leaving said path of travel at the other end of the spiral.

5. A structure as specified in claim 4, said instrumentalities comprising a rotary drum around which said spiral path of travel is formed, so that the axis of the spiral is coincident with the axis of the drum, and said drum having an interior heating chamber forming part of said means for supplying vulcanizing heat to said materials.

6. A structure as specified in claim 4, comprising an endless belt wound spirally to hold said materials in said spiral path of travel thereof.

7. In a vulcanizing machine, the combination of a plurality of separate and unconnected molds for vulcanizing a series of separate articles, insertable into the machine with the unvulcanized articles therein, and dischargeable from the machine with the vulcanized articles therein, instrumentalities for causing said molds to travel in series about an axis, adapted to maintain the articles a uniform distance from said axis, during the vulcanizing operation, and means for supplying vulcanizing heat to said molds, whereby the separate articles contained in said molds are vulcanized while in motion about said axis of movement, said instrumentalities being adapted to cause each mold to travel a plurality of times around said axis of motion.

8. In a vulcanizing machine, the combination of a plurality of separate and unconnected molds for vulcanizing a series of separate articles, insertable into the machine with the unvulcanized articles therein, and dischargeable from the machine with the vulcanized articles therein, instrumentalities for causing said molds to travel in series about an axis, adapted to maintain the articles a uniform distance from said axis, during the vulcanizing operation, and means for supplying vulcanizing heat to said molds, whereby the separate articles contained in said molds are vulcanized while in motion about said axis of movement, said instrumentalities being adapted to form a spiral path of travel for said molds, whereby each mold travels a plurality of times around said axis of motion.

9. In a vulcanizing machine, the combination of a plurality of separate and unconnected molds for vulcanizing a series of separate articles, insertable into the machine with the unvulcanized articles therein, and dischargeable from the machine with the vulcanized articles therein, instrumentalities for causing said molds to travel in series about an axis, adapted to maintain the articles a uniform distance from said axis, during the vulcanizing operation, and means for supplying vulcanizing heat to said molds, whereby the separate articles contained in said molds are vulcanized while in motion about said axis of movement, comprising a drum having a spiral path of travel to receive said molds in succession, and a belt wound spirally to travel on said molds, thereby to hold the molds against the drum while traveling along said spiral path of travel, and driving means whereby said belt and drum are driven to cause said molds to enter the spiral path of travel with the belt at one end of the drum and to leave said spiral path of travel with the belt at the other end of the drum.

10. In a vulcanizing machine, the combination of a plurality of separate and unconnected molds for vulcanizing a series of separate articles, insertable into the machine with the unvulcanized articles therein, and dischargeable from the machine with the vulcanized articles therein, instrumentalities for causing said molds to travel in series about an axis, adapted to maintain the articles a uniform distance from said axis, during the vulcanizing operation, and means for supplying vulcanizing heat to said molds, whereby the separate articles contained in said molds are vulcanized while in motion about said axis of movement, in combination with a guide for feeding the unconnected molds successively to the vulcanizing path of travel, and another guide for feeding the molds successively from said vulcanizing path of travel.

11. In a vulcanizing machine, the combination of a plurality of separate and unconnected molds for vulcanizing a series of separate articles, insertable into the machine with the unvulcanized articles therein, and dischargeable from the machine with the vulcanized articles therein, instrumentalities for causing said molds to travel in series about an axis, adapted to maintain the articles a uniform distance from said axis, during the vulcanizing operation, and means for supplying vulcanizing heat to said molds, whereby the separate articles contained in said molds are vulcanized while in motion about said axis of movement, said molds being curved about said axis of motion, and said structure comprising a belt wound spirally to travel on said curved molds, whereby the successive molds follow the spiral path of travel of the belt.

12. In a vulcanizing machine, the combination of a plurality of separate and unconnected molds for vulcanizing a series of separate articles, insertable into the machine with the unvulcanized articles therein, and dischargeable from the machine with the vulcanized articles therein, instrumentalities for causing said molds to travel in series about an axis, adapted to maintain the articles a uniform distance from said axis, during the vulcanizing operation, and means for supplying vulcanizing heat to said molds, whereby the separate articles contained in said molds are vulcanized while in motion about said axis of movement, each mold comprising an inner section and an outer section, the structure comprising a spirally wound belt to bear upon the outer section of each mold.

13. The method of vulcanizing a series of separate articles of manufacture, comprising the causing of said series of articles to travel along a spiral path of travel, while maintaining the articles separated and spaced apart in the desired manner, and applying vulcanizing heat to said articles while they are traveling along said spiral path of travel, whereby each article travels a plurality of times around the axis of the spiral path of travel.

14. A method as specified in claim 13, including the application of the heat within the spiral, so that each separate article is maintained at the same temperature while traveling the entire distance of said spiral path of travel.

15. A method as specified in claim 13, comprising the molding of said articles before they are allowed to enter the spiral path of travel, so that each article is properly formed before it enters the vulcanizing path of travel.

16. The improved vulcanizing apparatus, for vulcanizing rubber articles separately in series, having means forming a spiral path of travel for the separate articles, and means to supply vulcanizing heat to said articles while they are in motion along said path, and while they are maintained in spaced relation to each other, substantially as shown and described.

17. In apparatus for shaping materials in the desired form, the combination of forming means to receive the materials, and spiral means to press the materials into said forming means, said forming means comprising a series of molds, each mold comprising an outer section and an inner section, the two sections of each mold being held together by said spiral means during the operation of the apparatus, said molds being separate and unconnected and being adapted to be filled and then inserted one after the other in the spiral path of travel of said apparatus, and each mold being disconnected from the apparatus when discharged with the finished product therein.

18. In apparatus for vulcanizing rubber articles, the combination of means to establish a spiral path of travel for the stock from which the desired article is to be made, means for feeding the stock to said spiral path of travel, means in the form of a belt traveling spirally over the stock, and means for heating the stock to vulcanizing temperature while traveling in said path, comprising a rotary drum having said spiral path of travel on the outer surface thereof, with a series of molds in which the stock is formed, said molds being held against said drum by said belt, and each mold comprising an outer section and an inner section, whereby the stock from which the articles are made is compressed between the outer and inner sections of the successive molds while the drum is rotating, said molds being separate and unconnected and being adapted to be filled and then inserted one after the other in the spiral path of travel of said apparatus, and each mold being disconnected from the apparatus when discharged with the finished product therein.

JOHN L. G. DYKES.